(12) United States Patent
Das et al.

(10) Patent No.: US 9,596,257 B2
(45) Date of Patent: *Mar. 14, 2017

(54) DETECTION AND PREVENTION OF INSTALLATION OF MALICIOUS MOBILE APPLICATIONS

(71) Applicant: McAfee, Inc., Santa Clara, CA (US)

(72) Inventors: Sudeep Das, Cupertino, CA (US); Jayasankar Divakarla, Bangalore (IN); Pramod Sharma, Tanakpur (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,619

(22) Filed: Sep. 11, 2015

(65) Prior Publication Data
US 2016/0006757 A1    Jan. 7, 2016

Related U.S. Application Data

(63) Continuation of application No. 13/449,751, filed on Apr. 18, 2012, now Pat. No. 9,152,784.

(51) Int. Cl.
*G08B 23/00* (2006.01)
*G06F 12/16* (2006.01)
(Continued)

(52) U.S. Cl.
CPC .... *H04L 63/1441* (2013.01); *G06F 17/30876* (2013.01); *G06F 21/51* (2013.01); *H04W 12/12* (2013.01); *G06F 2221/033* (2013.01)

(58) Field of Classification Search
CPC . H04L 63/144; H04L 63/1466; H04L 12/585; H04L 2463/146; H04L 67/34
(Continued)

(56) References Cited

U.S. PATENT DOCUMENTS 5,987,610 A    11/1999 Franczek et al.
6,073,142 A     6/2000 Geiger et al.
(Continued)

FOREIGN PATENT DOCUMENTS

CN    101379479 A    3/2009
CN    102110220 A    6/2011
(Continued)

OTHER PUBLICATIONS

Vishnu S. Pendyala ; The Web as the Ubiquitous Computer; IEEE; Year: 2009; p. 90-93.*
(Continued)

*Primary Examiner* — Monjour Rahim
(74) *Attorney, Agent, or Firm* — Patent Capital Group

(57) ABSTRACT

A combination of shim and back-end server applications may be used to identify and block the installation of malicious applications on mobile devices. In practice, a shim application registers with a mobile device's operating system to intercept application installation operations. Upon intercepting an attempted installation operation, the shim application identifies the application seeking to be installed, generates a key uniquely identifying the application, and transmits the key over a network connection to a back-end server. The back-end server may be configured to crawl the Internet to identify malicious applications and compile and maintain a database of such applications. Upon receiving a key from the shim application, the back-end server can search its database to locate a matching application and, if found, respond to the mobile device with the application's status (e.g., malicious or not). The shim application can utilize this information to allow or block installation of the application.

18 Claims, 5 Drawing Sheets

(51) Int. Cl.
G06F 12/14 (2006.01)
G06F 11/00 (2006.01)
H04L 29/06 (2006.01)
G06F 21/51 (2013.01)
H04W 12/12 (2009.01)
G06F 17/30 (2006.01)

(58) Field of Classification Search
USPC .................................................. 726/23
See application file for complete search history.

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 8,001,606 B1 | 8/2011 | Spertus |
| 8,281,403 B1 | 10/2012 | Asheghian et al. |
| 8,332,946 B1 | 12/2012 | Boisjolie et al. |
| 8,510,369 B1 | 8/2013 | Ekke et al. |
| 8,950,007 B1 | 2/2015 | Teal et al. |
| 9,152,784 B2 | 10/2015 | Das et al. |
| 2003/0037105 A1 | 2/2003 | Yamada et al. |
| 2005/0007967 A1 | 1/2005 | Keskar et al. |
| 2005/0091269 A1 | 4/2005 | Gerber et al. |
| 2006/0150256 A1 | 7/2006 | Fanton et al. |
| 2007/0028303 A1* | 2/2007 | Brennan ............... G06F 21/55 726/24 |
| 2007/0099641 A1 | 5/2007 | Lastinger et al. |
| 2007/0191040 A1* | 8/2007 | Kadar ............... H04L 29/06027 455/466 |
| 2007/0240215 A1* | 10/2007 | Flores ................. G06F 21/55 726/24 |
| 2007/0240222 A1 | 10/2007 | Tuvell et al. |
| 2008/0040490 A1 | 2/2008 | Karlberg |
| 2008/0134178 A1 | 6/2008 | Fitzgerald et al. |
| 2008/0162704 A1* | 7/2008 | Poplett ................. H04L 67/142 709/228 |
| 2008/0229828 A1 | 9/2008 | Buschman et al. |
| 2009/0075630 A1 | 3/2009 | McLean |
| 2009/0113425 A1 | 4/2009 | Ports et al. |
| 2009/0210702 A1 | 8/2009 | Welingkar et al. |
| 2010/0058431 A1 | 3/2010 | McCorkendale et al. |
| 2010/0058468 A1 | 3/2010 | Green et al. |
| 2010/0077445 A1 | 3/2010 | Schneider et al. |
| 2010/0088367 A1 | 4/2010 | Brown et al. |
| 2010/0112981 A1 | 5/2010 | Suh et al. |
| 2010/0284290 A1 | 11/2010 | Williams |
| 2010/0318992 A1 | 12/2010 | Kushwaha et al. |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0065419 A1 | 3/2011 | Book et al. |
| 2011/0083186 A1 | 4/2011 | Niemela et al. |
| 2011/0125601 A1 | 5/2011 | Carpenter et al. |
| 2011/0145564 A1 | 6/2011 | Moshir et al. |
| 2011/0145920 A1 | 6/2011 | Mahaffey et al. |
| 2011/0167261 A1 | 7/2011 | Fanton et al. |
| 2011/0167474 A1 | 7/2011 | Sinha et al. |
| 2011/0185423 A1 | 7/2011 | Sallam |
| 2011/0225655 A1 | 9/2011 | Niemel et al. |
| 2012/0023583 A1 | 1/2012 | Sallam |
| 2012/0030293 A1 | 2/2012 | Bobotek |
| 2012/0030750 A1 | 2/2012 | Bhargava et al. |
| 2012/0054841 A1 | 3/2012 | Schultz et al. |
| 2012/0129503 A1 | 5/2012 | Lindeman et al. |
| 2012/0209923 A1 | 8/2012 | Mathur et al. |
| 2012/0222120 A1 | 8/2012 | Rim et al. |
| 2012/0240183 A1 | 9/2012 | Sinha |
| 2012/0291102 A1 | 11/2012 | Cohen |
| 2012/0291103 A1 | 11/2012 | Cohen |
| 2012/0323829 A1 | 12/2012 | Stokes et al. |
| 2012/0324568 A1 | 12/2012 | Wyatt et al. |
| 2013/0097659 A1 | 4/2013 | Das et al. |
| 2013/0097660 A1 | 4/2013 | Das et al. |
| 2013/0232573 A1 | 9/2013 | Saidi et al. |
| 2013/0283377 A1 | 10/2013 | Das et al. |
| 2015/0180908 A1 | 6/2015 | Dang et al. |

FOREIGN PATENT DOCUMENTS

| | | |
|---|---|---|
| EP | 2 169 580 A2 | 3/2010 |
| KR | 10-0733387 B1 | 6/2007 |
| KR | 10-2011-0084693 A | 7/2011 |
| WO | WO 2006/102399 A1 | 9/2006 |
| WO | WO 2011/030352 A3 | 5/2011 |
| WO | WO 2013/059131 | 4/2013 |
| WO | WO 2013/059138 | 4/2013 |
| WO | WO 2013/158789 A1 | 10/2013 |

OTHER PUBLICATIONS

Information Technology Risk Management, Copyright 2002, © Glen B. Alleman, Niwor, Colorado, 22 pages.
USPTO Jan. 31, 2013 Nonfinal Office Action from U.S. Appl. No. 13/275,293, 22 pages.
International Search Report and Written Opinion for International Application No. PCT/US2012/060302 mailed Jan. 25, 2013, 9 pages.
International Search Report and Written Opinion for International Application No. PCT/US2012/060281 mailed Feb. 27, 2013, 10 pages.
USPTO Aug. 2, 2013 Final Office Action from U.S. Appl. No. 13/275,293, 30 pages.
International Search Report and Written Opinion for International Application No. PSC/US2013/037017 mailed Jul. 26, 2013, 11 pages.
USPTO Aug. 28, 2013 Final Office Action from U.S. Appl. No. 13/275,308, 33 pages.
USPTO Feb. 7, 2013 Office Action from U.S. Appl. No. 13/275,308, mailed on Feb. 7, 2013, 17 pages.
USPTO Dec. 16, 2013 Nonfinal Office Action from U.S. Appl. No. 13/275,293, 23 pages.
USPTO Dec. 19, 2013 Nonfinal Office Action from U.S. Appl. No. 13/449,751, 20 pages.
Shuaifu Dai; Behavior-Based Malware Detection on Mobile Phone; Sep. 23-25, 2010; pp. 1-4, 4 pages.
International Preliminary Report on Patentability in International Application No. PCT/US2012/060281, mailed Apr. 22, 2014, 6 pages.
International Preliminary Report on Patentability in International Application No. PCT/US2012/060302, mailed Apr. 22, 2014, 6 pages.
USPTO Jun. 19, 2014 Final Office Action from U.S. Appl. No. 13/449,751, 19 pages.
USPTO Jul. 3, 2014 Final Office Action from U.S. Appl. No. 13/275,293, 34 pages.
USPTO Sep. 10, 2014 Nonfinal Rejection received for U.S. Appl. No. 13/275,308, 35 pages.
International Preliminary Report on Patentability in International Application No. PCT/US2013/037017, mailed Oct. 21, 2014, 9 pages.
USPTO Jan. 16, 2015 Nonfinal Office Action from U.S. Appl. No. 13/449,751, 13 pages.
USPTO Mar. 20, 2015 Final Rejection received for U.S. Appl. No. 13/275,308, 34 pages.
USPTO May 5, 2015 Notice of Allowance from U.S. Appl. No. 13/449,751, 8 pages.
Supplementary European Search Report from EP Application No. EP 12 84 2408, mailed Jun. 3, 2015, 6 pages.
Uspto Aug. 26, 2015 Nonfinal Rejection received for U.S. Patent Application No. 13/275,308 [Attorney Docket No. 04796-1107], 33 pages.
Supplementary European Search Report in EP Application No. EP 13 77 8473, mailed on Nov. 23, 2015, 8 pages.
Office Action in CN Application No. 201280053562.1, mailed on Nov. 12, 2015, English translation, 21 pages.

(56) References Cited

OTHER PUBLICATIONS

USPTO Jan. 20, 2016 Nonfinal Office Action from U.S. Appl. No. 14/580,930, 19 pages.
USPTO Apr. 15, 2016 Final Rejection received for U.S. Appl. No. 13/275,308, 39 pages.
Office Action in CN Application No. 201280050860.5, mailed on Apr. 14, 2016, no English translation, 14 pages.
Office Action in CN Application No. 201380016442.9, mailed on Jun. 12, 2016, with English translation, 24 pages.
Office Action in CN Application No. 201280053562.1, mailed on Jul. 6, 2016, with English translation, 29 pages.
USPTO Jul. 27, 2016 Final Office Action from U.S. Appl. No. 14/580,930, 21 pages.
Office Action in CN Application No. 201280050860.5, mailed on Aug. 2, 2016, no English translation, 13 pages.

* cited by examiner

DETECTION AND PREVENTION OF INSTALLATION OF MALICIOUS MOBILE APPLICATIONS

RELATED U.S. APPLICATION INFORMATION

This Application is a continuation (and claims the benefit under 35 U.S.C. §120) of U.S. application Ser. No. 13/449,751, filed Apr. 18, 2012, entitled "DETECTION AND PREVENTION OF INSTALLATION OF MALICIOUS MOBILE APPLICATIONS," Inventors Sudeep Das, et al. The disclosure of the prior application is considered part of (and is incorporated in its entirety by reference in) the disclosure of this application. This application is related to commonly assigned U.S. patent application Ser. No. 13/275,293, filed Oct. 17, 2011, entitled "System and Method for Whitelisting Applications in a Mobile Network Environment," by inventors Sudeep Das, et al., which is considered part of this application and is incorporated by reference herein in its entirety.

TECHNICAL FIELD

This disclosure relates generally to the field of computer security. More particularly, but not by way of limitation, it relates to systems, methods, and computer program products to prevent the installation of malicious applications on a mobile device without taxing the limited memory and processing resources of the mobile device.

BACKGROUND

Malware is a broad term used to describe malicious software that infects computer systems and can have varying degrees of effects. For example, the effects of malware can range from irritating and unwanted adware and spyware to computer viruses, worms, and Trojan horses that can render a computer system virtually useless. While the threat of malware is generally well-known to personal computer users, users of mobile devices are generally less aware that similar threats exist with respect to mobile devices. In fact, as the usage and capabilities of mobile devices increases, so too does the threat of contracting unwanted malware on mobile devices.

Although it is common practice to employ some type of antivirus application (the term antivirus referring to a wide variety of anti-malware software) on personal computers to detect and remove malware and repair its effects, the nature of mobile devices (e.g., memory constraints, processing constraints, battery life, etc.) presents certain obstacles to the implementation of similar antivirus applications. For example, typical antivirus applications executing on personal computers comprise a database of malware signatures, representative of known malware, against which system files can be compared to detect malware. Although the memory consumed by a database of malware signatures is acceptable in the context of the memory resources of a personal computer, it is not ideal in the context of the comparatively smaller memory resources of a mobile device. Moreover, because malware creators continuously introduce new and unique forms of malware, antivirus applications must be updated regularly to include signatures to identify new forms of malware. Accordingly, antivirus software providers routinely distribute definition files as updates to their antivirus applications. These updated definition files are typically retrieved from the antivirus software provider via the Internet. Here again, while the bandwidth used to retrieve updated definition files is acceptable in the context of a personal computer, mobile bandwidth is limited and expensive with data providers commonly enforcing data allowances and imposing fees on users that exceed these allowances. Likewise, the processing requirements to scan system files against the database of signatures are acceptable in the context of personal computers but are not ideal with respect to mobile devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
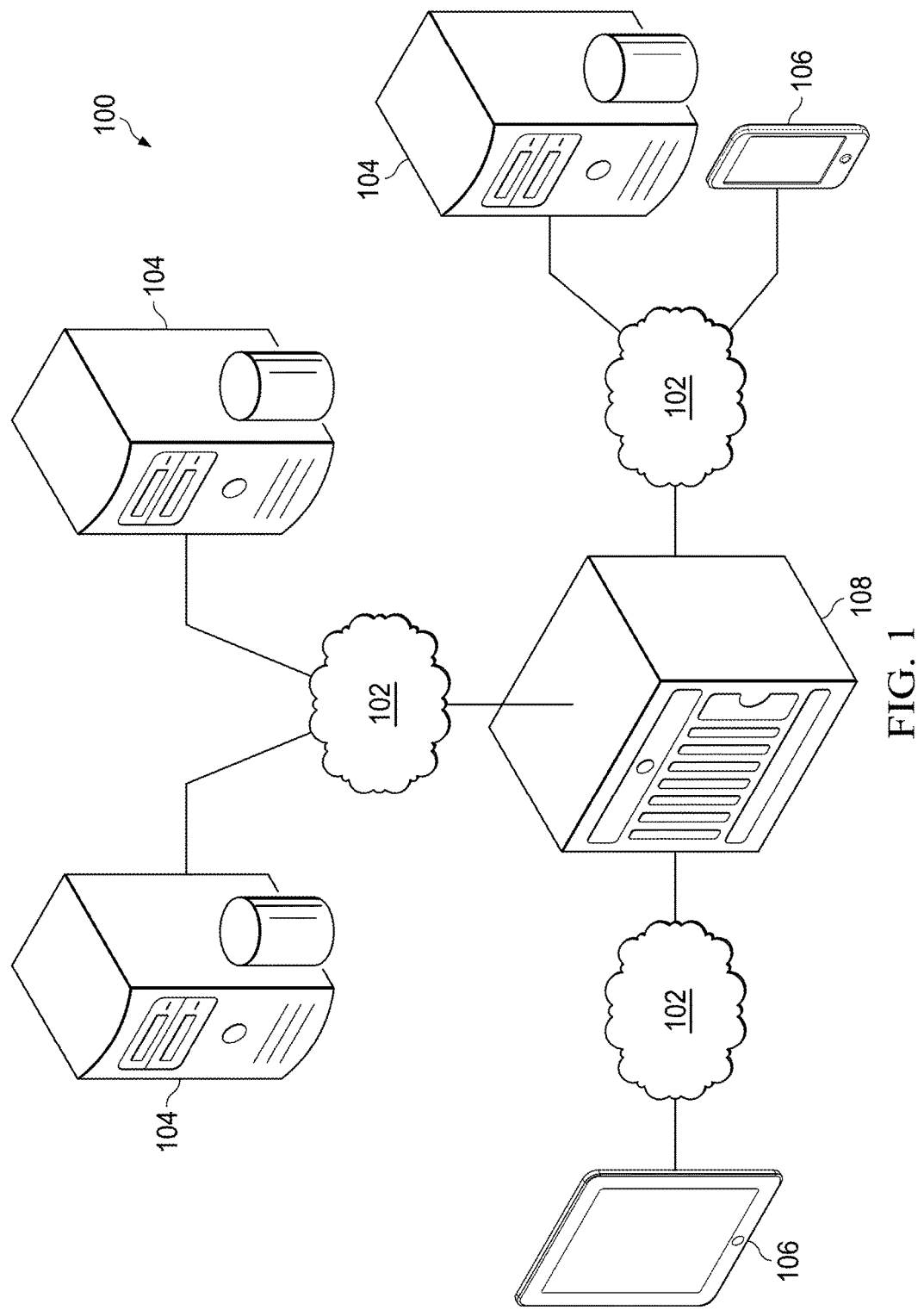
FIG. 1 is a block diagram illustrating a network architecture according to one embodiment.

A method is described in example embodiments below and comprises intercepting a request to install an application on a mobile device, generating a key that uniquely identifies the application, and sending the key over a network connection to a server application. The method further includes receiving a response over the network connection indicating a status of the application and blocking an installation of the application when the status indicates that the application is malicious. In further embodiments, the act of intercepting a request to install an application on the mobile device includes registering a shim application as a background service on the mobile device. In more specific embodiments, the act of registering the shim application as a background service on the mobile device comprises registering the shim application to intercept an invocation of an application programming interface that is utilized to initiate an installation of the application on the mobile device. The method may be performed by utilizing a processor of the mobile device.

In another example embodiment, a method is described that comprises receiving an application identifier from a mobile device over a network connection. The method also includes utilizing the application identifier to determine a status of the application from a database of records, which includes a plurality of analyzed applications. The method further includes sending the status of the application to the mobile device over the network connection. In further embodiments, the application identifier comprises a key that uniquely identifies the application and metadata associated with the application. In yet other embodiments, the act of utilizing the application identifier to determine a status of the application comprises searching the database to determine if a record matching the key exists in the database. In more specific embodiments, the act of utilizing the metadata to imply the status of the application from the records in the database when it is determined that no record matching the key exists in the database.

Example Embodiments

Various embodiments, described in greater detail below, provide a system and technique for identifying malicious applications and blocking their installation on a mobile device. In one implementation, a shim application is installed on a mobile device that registers with the device's operating system to intercept mobile application installation operations. Upon intercepting an attempted installation operation on a mobile device, the shim application can identify the mobile application to which the installation operation applies, generate a key that uniquely identifies the mobile application, and transmit the key to a back-end server. The back-end server can be configured to crawl the Internet in search of mobile applications, analyze identified applications to detect malicious applications, and compile and maintain a database of identified applications along with their statuses. Upon receiving a key from the shim application, the back-end server can search the database to locate a matching application and respond to the mobile device with the application's status. The shim application may utilize this information to either allow or block installation of the mobile application.

Referring to FIG. 1, network architecture 100 in accordance with one embodiment is illustrated. As shown, a plurality of networks 102 is provided. In the context of the present network architecture 100, networks 102 may each take any form including, but not limited to, a local area network (LAN), a wireless network, or a wide area network (WAN) such as the Internet.

Coupled to networks 102 are data server computers 104 which are capable of communicating over networks 102. Also coupled to networks 102 and data server computers 104 is a plurality of mobile devices 106. Data server computers 104 may include a desktop computer, laptop computer, hand-held computer, any component of a computer, and/or any other type of logic. Mobile devices 106 may include mobile phones, smartphones, e-book readers, tablet computers, personal digital assistants (PDAs), and/or other similar mobile devices capable of initiating voice, audio, video, media, or data exchanges within network architecture 100. In order to facilitate communication among networks 102, at least one gateway or router 108 is optionally coupled there between.

Figure 2:
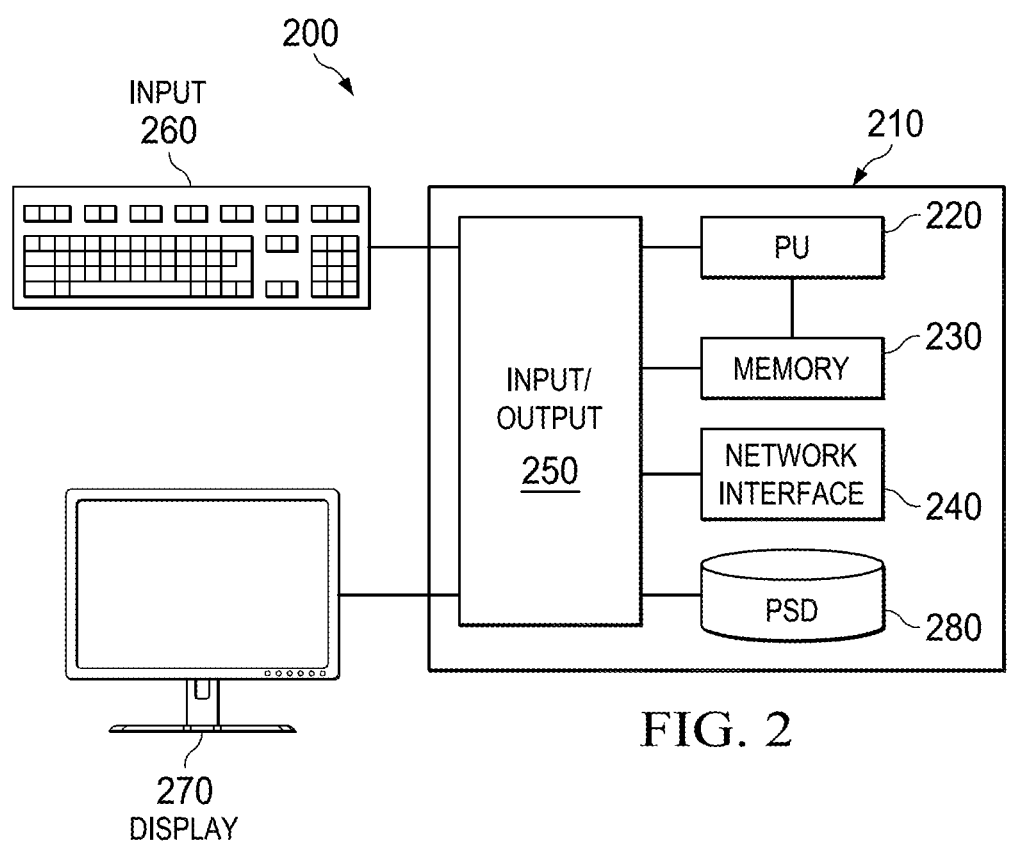
FIG. 2 is a block diagram illustrating a device on which software according to one embodiment may be installed.

Referring now to FIG. 2, example processing device 200 for use in conjunction with one embodiment is illustrated in block diagram form. Processing device 200 may serve as a gateway or router 108, mobile device 106, or a server computer 104. Example processing device 200 includes system unit 210 which may be optionally connected to input device 260 (e.g., keyboard, mouse, touch screen, etc.) and display 270. Program storage device (PSD) 280 (sometimes referred to as a hard disc or computer readable medium) is included with system unit 210. Also included with system unit 210 is network interface 240 for communication via a network with other computing and corporate infrastructure devices (not shown). Network interface 240 may be included within system unit 210 or may be external to system unit 210. In either case, system unit 210 can be communicatively coupled to network interface 240. Program storage device 280 represents any form of non-volatile storage including, but not limited to, all forms of optical and magnetic memory, including solid-state memory, including removable media, and may be included within system unit 210 or be external to system unit 210. Program storage device 280 may be used for storage of software to control system unit 210, data for use by processing device 200, or both.

System unit 210 may be programmed to perform methods in accordance with this disclosure. System unit 210 comprises processor unit (PU) 220, input-output (I/O) interface 250 and memory 230. Processing unit 220 may include any programmable controller device including, for example, a mainframe processor, one or more members of the Intel Atom®, Core®, Pentium® and Celeron® processor families from Intel Corporation, or a device from the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company). Memory 230 may include one or more memory modules and comprise random access memory (RAM), read only memory (ROM), programmable read only memory (PROM), programmable read-write memory, and solid-state memory. PU 220 may also include some internal memory including, for example, cache memory.

Processing device 200 may have resident thereon any desired operating system. Embodiments may be implemented using any desired programming language, and may be implemented as one or more executable programs or modules, which may link to external libraries of executable routines that may be supplied by the provider of the operating system or any other desired provider of suitable library routines. As used herein, the term "a computer system" or "the computer system" can refer to a single computer or a plurality of computers working together to perform the function described as being performed on or by a computer system. Program instructions to configure processing device 200 to perform disclosed embodiments may be provided stored on any type of non-transitory computer-readable media, or may be downloaded from a server 104 onto program storage device 280.

Figure 3:
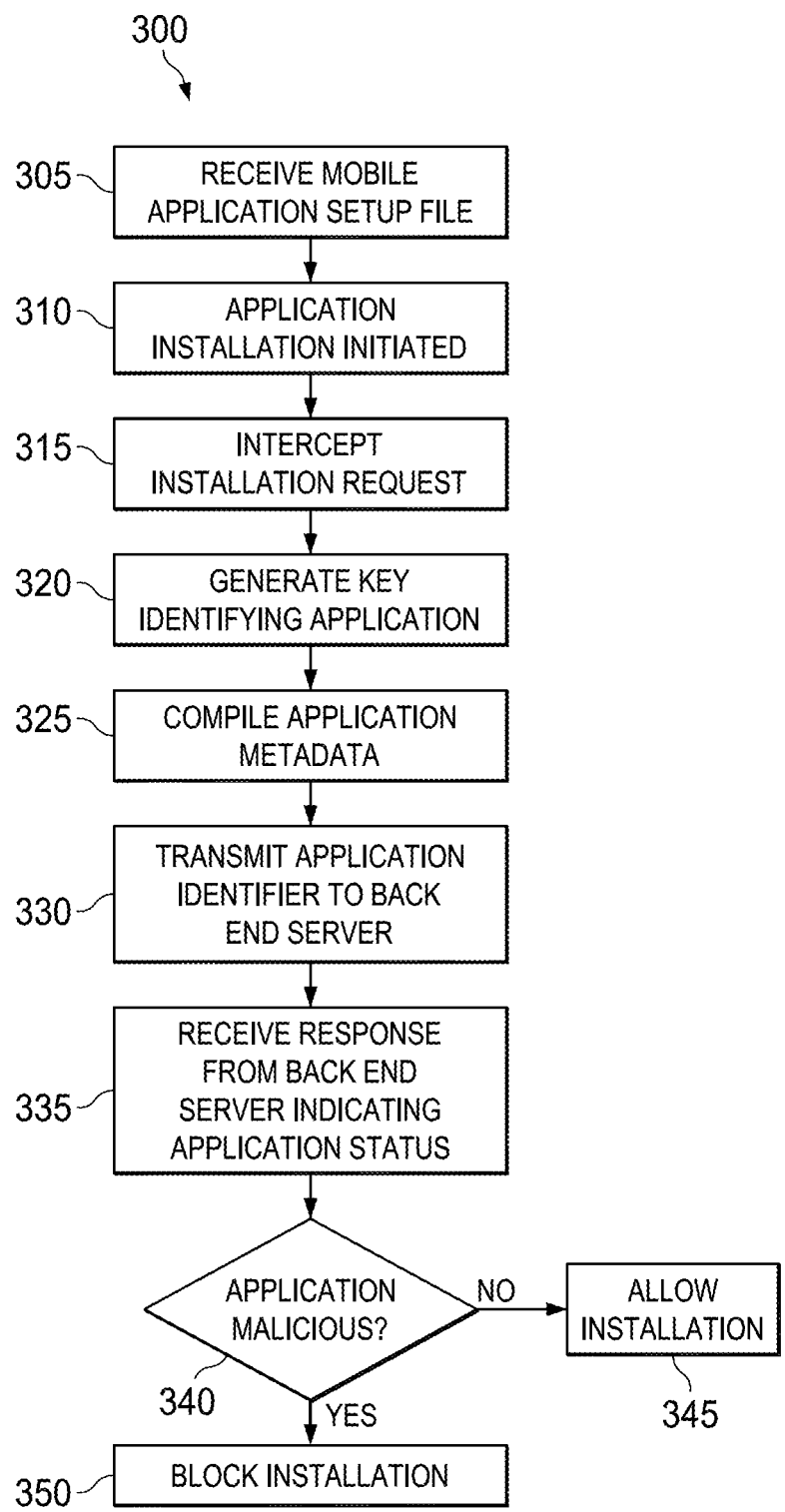
FIG. 3 is a flowchart illustrating a process by which a malicious application is detected and prevented from being installed on a mobile device according to one embodiment.

Referring now to FIG. 3, process 300 illustrates an example process flow by which a malicious application may be detected and prevented from being installed on mobile device 106 in accordance with one embodiment. At step 305, a mobile application setup file may be received at mobile device 106. As used herein, a "mobile application setup file" refers to computer program code that initiates installation of an application on a mobile device 106. The terms "application" and "mobile application" are used interchangeably to refer to application software that runs on (or is capable of running on) a mobile device and provides certain functionality to the mobile device's user. Mobile applications are practically limitless in number and can be categorized according to the functionality that they provide. Examples of such mobile applications include productivity applications (e.g., calendar, email, and contacts applications), web browser applications, social networking applications, banking applications, GPS-based navigation applications, e-reader applications, music applications, video game applications, etc. Typically, an application setup file may be received at mobile device 106 at the request of a user. For example, a user of mobile device 106 may download an application from an online application repository. Online application repositories may be associated with a provider of the operating system of the mobile device 106 (e.g., Apple® App Store, Google® Android Market, RIM® App World, etc.) or may be maintained by an independent third party (e.g., Amazon® AppStore, etc.). (APPLE is a registered trademark of Apple Inc. GOOGLE is a registered trademark of Google Inc. RIM is a registered trademark of Research in Motion Limited Corporation. AMAZON is a registered trademark of Amazon Technologies, Inc.). Although the application setup file may be received at mobile device 106 at the request of a user, the application setup file might also be received without the knowledge of the user. For example, a malicious application may include code that enables the application to propagate between mobile devices 106 unbeknownst to users of these devices.

At step 310, installation of the application on mobile device 106 is initiated as a result of the execution of the application setup file. Typically, application installation is initiated automatically upon receipt of the application setup file at mobile device 106. For example, when an application is downloaded from an online application repository, the application setup file will typically be executed automatically upon receipt to initiate application installation. Although installation of an application may be initiated automatically, application installation might also be initiated at a specific time or upon the occurrence of a specific event on mobile device 106. Like the receipt of the application setup file, installation of an application might also occur without the knowledge of the user of the mobile device. As part of the installation process, an installation request may be sent to mobile device 106's operating system.

At step 315, the installation request is intercepted. In one embodiment, a shim application can run as a background service on mobile device 106 and registers to receive installation requests. Once installed, subsequent installation requests directed to the operating system may first be delivered to the shim application. The shim application can then identify the mobile application that is associated with the intercepted installation request.

At step 320, the shim application may generate a key that uniquely identifies the mobile application associated with the intercepted installation request. In one embodiment, the key may be generated by computing a hash (e.g., hash value, hash code, checksum, etc.) of the mobile application setup file or some portion thereof. For example, the hash value can be computed by applying a hash algorithm (such as MD5, SHA-1, etc.) to the application setup file or some portion thereof. As is known in the art, such hash algorithms are utilized to map a large data set (e.g., the data contained in the application setup file) to a smaller data set that can be used to identify elements of the large data set. Typically, a mobile application setup file is distributed as an archive file that packages the contents of the mobile application. Accordingly, a hash of the mobile application setup file or some predetermined content of the setup file can be used to uniquely identify the mobile application.

At step 325, the shim application can compile metadata associated with the application. Such metadata may include any identifying information associated with the application. For example, the shim application may compile the application name, the software company that developed the application, a signature used to digitally sign the application, etc. In one embodiment, the metadata may be located in one or more predefined locations identified in the application setup file. Thus, the shim application may simply retrieve the data from these predefined locations to compile the metadata.

At step 330, the shim application transmits the key and the metadata (collectively the application identifier) to a back-end server. As will be described in greater detail below, based on the connected nature of mobile devices, the application identifier can be transmitted from mobile device 106 to the back-end server using a variety of different protocols. An application executing from/on the back-end server may be configured to find mobile applications (e.g., by crawling the Internet in search of mobile applications) and/or receive mobile applications (e.g., by receiving mobile applications from mobile devices, mobile application providers, etc.) and to assess the status and/or determine a reputation score of the mobile applications. For example, a back-end server application, or more simply a "server application," may detect mobile applications at independent websites that provide one or more mobile applications or at online application repositories, such as those described above. Upon detecting a mobile application, the server application can download the mobile application and perform a behavioral analysis, the goal of which can be to identify characteristics of the mobile application and ultimately determine the status of the mobile application as malicious or benign. These records may be compiled and maintained in a database by the server application.

The functionality of the server application is described in greater detail in related U.S. application Ser. No. 13/275,293, filed Oct. 17, 2011 ("the '293 application'), which was previously incorporated herein by reference in its entirety. At least some potential functions of the server application of this application are described in the '293 application with reference to a reputation engine (referenced as "reputation engine 20") and with reference to a server (referenced as "server 17" and as "whitelist server 17"). These functions may be consolidated or integrated in any suitable manner. In some cases, the server application may perform all of the functions of "reputation engine 20", "server 17", and "whitelist server 17", and/or any of the activities associated with finding and/or receiving mobile applications, assessing the status of mobile applications, storing statuses and/or reputation scores in a database, identifying applications in the database, and providing responses to mobile devices indicating reputation scores or statuses of identified applications. Alternatively, these functions may be logically separated in any suitable arrangement and performed by discrete hardware and/or software (e.g., an implementation in which the server application includes multiple discrete components that run on the same or separate hardware devices to perform the different functions).

The server application may utilize the information contained in the application identifier received from mobile device 106 to identify a matching application in the database. In one embodiment, the server application may store the results of its analysis of an application in conjunction with a key value associated with the application (e.g., the result of the same hash algorithm applied by the shim application to generate the key). Thus, upon receiving a key, the server application may utilize the key to identify the corresponding mobile application in the database.

At step 335, a response is received at mobile device 106 from the server application. In one embodiment, the response from the server application may specify a reputation score associated with the mobile application, and could be based on the server application's analysis of the mobile application. In another embodiment, the response might simply identify the mobile application as either malicious or benign.

At step 340, the mobile device can utilize the response from the server application to determine if the mobile application associated with the intercepted installation request is malicious. Based on the type of response received from the server application, operation 340 may involve comparing a received reputation score to a predefined reputation score threshold to determine if the mobile application is malicious or may simply involve accepting the server application's designation of the mobile application as malicious or benign.

If the mobile application is determined not to be malicious at step 340, installation of the mobile application may be allowed at 345. If, however, the mobile application is determined to be malicious at step 340, its installation may be blocked at step 350. Because the shim application does not involve the storage of malware signatures and whitelist signatures, or the comparison of application files to such signatures, the described embodiment allows for computer code having a "thin" presence on mobile device 106 to detect and block the installation of malicious applications by transferring the memory and processing requirements (e.g., needed for the storage and comparison of malware and whitelist signatures) to a remote back-end server.

Figure 4:
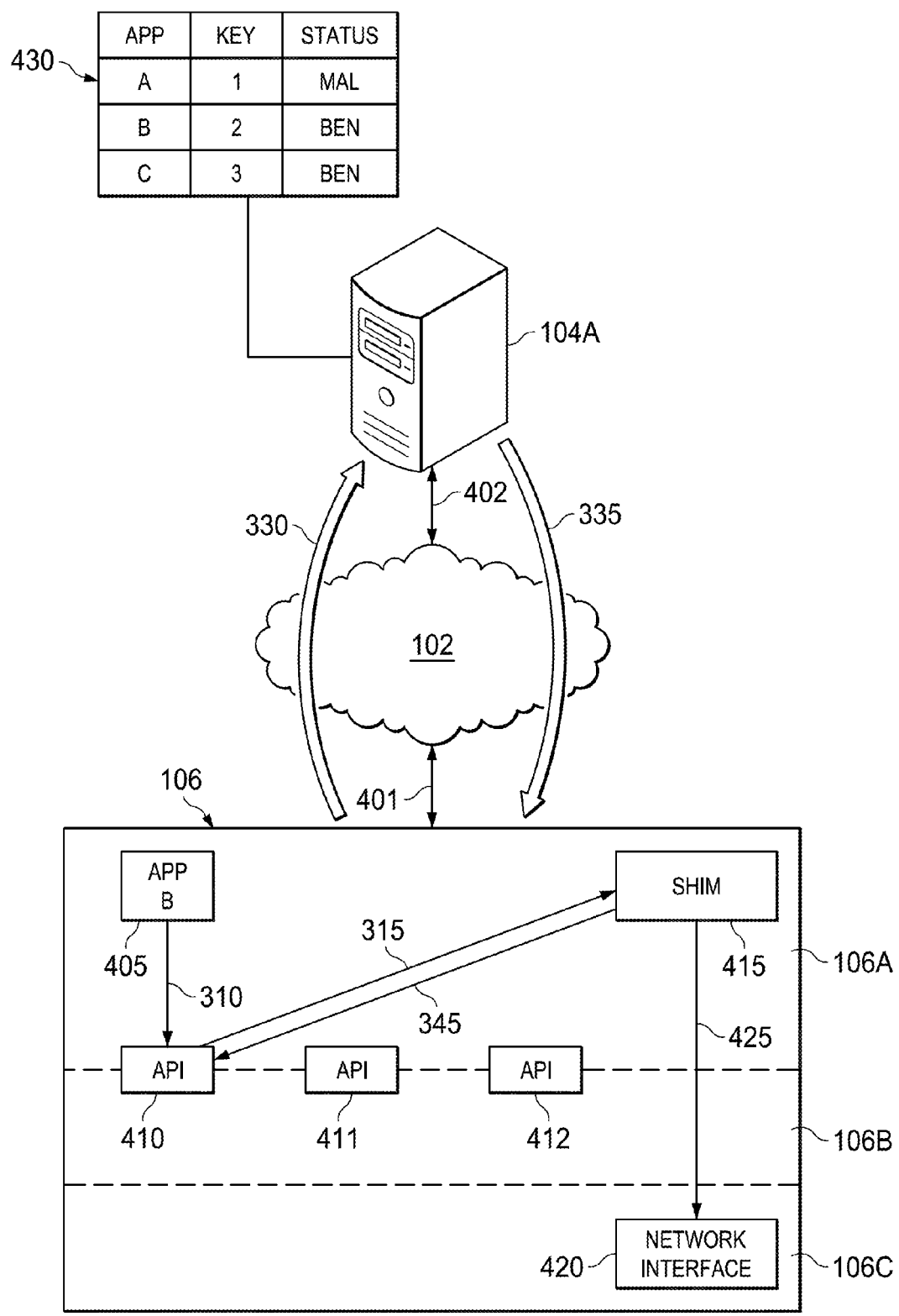
FIG. 4 is a block diagram illustrating a network architecture on which a malicious application is detected and prevented from being installed on a mobile device according to one embodiment.

Referring now to FIG. 4, a block diagram illustrates a network architecture in which a malicious application may be detected and prevented from being installed on a mobile device in accordance with one embodiment. In the depicted embodiment, mobile device 106 is connected 401 to network 102 and back-end server 104A is connected 402 to network 102. Although mobile device 106 and back-end server 104A are illustrated as connected to network 102, this is not intended to imply that the devices are necessarily directly connected or communicate using a common communication protocol. As illustrated, mobile device 106 includes application layer 106A, operating system layer 106B, and hardware layer 106C. These layers perform dedicated tasks and cooperate with each other in order to provide certain functionality to a user of mobile device 106.

In the depicted embodiment, application setup file 405 for a mobile application labeled "App B" resides in application layer 106A of mobile device 106. As described above, application setup file 405 may be received at mobile device 106 at the request of a user (e.g., by downloading "App B" from an online application repository) or without the knowledge of the user of the device. In a particular embodiment in which mobile device 106 employs the Android operating system, application setup file 405 might be implemented as an Android Package (.apk) file. Application setup file 405 is typically an archive file that contains all of the program code for "App B" and is utilized to initiate the installation of "App B" on mobile device 106. Installation of the mobile application can be coordinated with the operating system of mobile device 106. As is known in the art, application programming interfaces (APIs) (e.g., APIs 410, 411, and 412) may provide the interface between application layer 106A and operating system layer 106B. Accordingly, a particular API 410 that is utilized to initiate installation of an application on mobile device 106 may be invoked 310 upon execution of application setup file 405. To continue the above example, if mobile device 106 employs the Android operating system, API 410 may be implemented as an Intent object specifying the performance of an installation action. As is known by those skilled in the art, an Intent object is a data structure that provides a description of an operation to be performed.

Shim application 415 can be an application that runs continuously as a background service on mobile device 106 within application layer 106A. Shim application 415 can implement some or all of the functionality described here by registering to intercept application installation operations such as API invocation 310. For example, shim application 415 may register with the operating system of mobile device 106 to receive calls directed to one or more specified APIs. In one embodiment, the one or more specified APIs correspond to APIs utilized to initiate a new application installation or to initiate the installation of an updated version of an existing application. As such, shim application 415 may register to receive an invocation of API 410 but may ignore invocation of APIs 411 and 412, which are unrelated to the installation or update of an application. In the context of mobile device 106 employing the Android operating system, shim application 415 may register to receive any Intent objects having an Activity Action that is related to the installation of a new application or an updated version of an existing application. Consequently, invocation of API 410 after shim application 415 is installed on mobile device 106 can result in the installation operation being redirected 315 to shim application 415. Upon receiving the intercepted installation operation, shim application 415 can identify the mobile application associated with the installation operation (i.e., App B). Typically the mobile application can be identified directly from the intercepted installation operation. For example, in the context of mobile device 106 employing the Android operating system, the mobile application associated with the intercepted installation operation might be specified within the Intent object as the data upon which the activity action is to act.

Once App B is identified as the mobile application associated with the installation operation, shim application 415 can generate a key that uniquely identifies App B. In one embodiment, this key can be generated by computing a hash value of application setup file 405 or some predetermined portion of setup file 405. The hash value may be computed by applying any known hash function (e.g., MD5, SHA-1, etc.) that allows the application to be uniquely identified. In one embodiment, if application setup file 405 is an Android Package (.apk) file, the hash function may be applied to the .apk file itself or to a component of the .apk file—such as an internal classes.dex file—to uniquely identify the mobile application as App B. In one embodiment, shim application 415 may provide the computer code to generate the key (e.g., by performing a hash function on setup file 405 or a portion thereof). In another embodiment, shim application 415 may utilize either another application or a service of the operating system to generate the key.

Shim application 415 may additionally compile metadata associated with the mobile application. For example, the shim application may determine the application's name, the software company that developed the application, a signature used to digitally sign the application, and/or any other metadata that may provide information about the application. In one embodiment, this metadata may be retrieved from certain predefined portions of application setup file 405. Accordingly, shim application 415 may simply extract the data stored in these predefined portions of setup file 405. The key and metadata (collectively the application identifier) can then be packaged and transmitted to back-end server 104A. In one embodiment, the application identifier is encrypted using a known cryptographic technique prior to being communicated to back-end server 104A.

Once the application identifier is ready to be communicated to back-end server 104A (i.e., the server application), shim application 415 can determine a communication protocol to be utilized to transmit the information to back-end server 104A. Based on the connected nature of mobile devices, a variety of protocols may be available for communicating the application identifier to back-end server 104A. In one embodiment, if mobile device 106 is connected to the Internet, the application identifier may be communicated to back-end server 104A via the Internet connection. In another embodiment, the application identifier may be communicated to back-end server 104A using a telephony-specific communication channel. For example, the application identifier may be communicated to back-end server 104A via a short message service (SMS) message to a predefined telephone number. The application identifier may also be communicated using dual-tone multi-frequency signaling or interactive voice response (IVR) messaging by initiating communications between mobile device 106 and a predefined telephone number. In one embodiment, the predefined telephone number may be a toll free telephone number provided by a security vendor, such as the provider of shim application 415. In a further embodiment, the application identifier may be communicated to another device that has a preferred connection to back-end server 104A and sent from that device to back-end server 104A. For example, mobile device 106 may not have an available connection to back-end server 104A but may be connected to a laptop that has an Internet connection. In such a case, the application identifier may be transmitted to the laptop for further transmission to back-end server 104A via the laptop's Internet connection.

In one embodiment, the appropriate communication protocol may be determined based on default priorities. For example, communication of the application identifier to back-end server 104A over the Internet may be preferred when an Internet connection is available. Accordingly, communication via the Internet may have the highest priority. As such, shim application 415 may proceed through a priority list starting with the highest priority protocol and may select the first communication protocol that is available. In one embodiment, the priority list may be configurable by a user of mobile device 106.

Shim application 415 can additionally determine an appropriate back-end server 104A to which the application identifier should be communicated. Although FIG. 4 illustrates a single back-end server 104A, there will typically be multiple back-end servers available. In one embodiment, the appropriate back-end server 104A may be determined based on a geographic location of the mobile device (e.g., based on a GPS location of the mobile device). In another embodiment, one or more back-end servers 104A may be dedicated to a particular mobile device 106. Accordingly, the type of mobile device 106 may determine the appropriate back-end server 104A. In a further embodiment, back-end server 104A may be determined based on a level of shim application 415. For example, a premium version of shim application 415 may be associated with a larger pool of back-end servers 104A than a standard version of shim application 415 such that a response may be received more rapidly for the premium version. When shim application 415 determines the appropriate communications protocol and back-end server 104A, the application identifier can be routed to an appropriate network interface 420 of mobile device 106 at 425 for transmission to back-end server 104A.

At 330, the application identifier is transmitted to back-end server 104A. The application identifier may be utilized by back-end server 104A to determine the status of the application. As described above with respect to FIG. 3, the server application executing on back-end server 104A maintains database 430 of applications that have been previously identified and analyzed. In the illustrated embodiment, database 430 includes the name of the application, the application's key (i.e., the key matching that computed by shim application 415), and the status of the application. For purposes of clarity, the illustrated database 430 contains a limited number of fields. However, database 430 may also include additional information pertaining to analyzed applications. For example, rather than a discrete status that identifies an application as either malicious or benign, the status field may contain a numerical reputation score associated with the application. Shim application 415 may utilize a reputation score to compare to a configurable reputation threshold in order to determine if a mobile application is ether malicious or benign. In one embodiment, additional fields of database 430 may identify properties of a mobile application that contributed to the application's reputation score.

In the depicted embodiment, App B corresponds to a key value of 2. Thus, in response to receiving the application identifier, the server application executing on back-end server 104A may extract the key. Because shim application 415 and the server application utilize the same function to compute the key for a mobile application, the key in the received application identifier will also have a value of 2, corresponding to the attempted installation of App B on mobile device 106. The server application can utilize the key value to search database 430 to determine that App B has a benign status. Accordingly, App B is not malicious and it is acceptable for mobile device 106 to install App B. If, however, the application identifier had indicated a key value of 1, corresponding to App A, the server application would determine that App A is malicious and should not be installed on the mobile device.

At 335, a response indicating the status of App B is transmitted from the back-end server 104A (by the server application) to mobile device 106. In one embodiment, the response from the server application may be communicated utilizing the same protocol as that utilized to transmit the application identifier to the back-end server 104A. In an alternate embodiment, however, the response from the server application may be communicated utilizing a different protocol than that utilized to transmit the application identifier. In one embodiment, the response from the server application may be encrypted. Because response 335 indicates that App B is benign, shim application 415 allows the call to API 410 to proceed at 345, thereby permitting the installation of App B on mobile device 106. When an application is determined to be benign, the interception of the call to the installation operation and querying of the back-end server is transparent to the user of mobile device 106 such that installation of the mobile application appears to the user to occur in the normal manner. When an application is determined to be malicious, shim application 415 may alert the user of mobile device 106 that the application has been determined to be malicious and therefore will not be installed (or only installed if the user affirmatively overrides the provided alert) and may coordinate the deletion of the application setup file associated with the malicious application. Because the bulk of the processing and memory requirements to identify and determine the status of a mobile application are satisfied by an application executing on back-end server 104A, shim application 415 requires only limited memory and processing resources. Accordingly, a mobile application can be identified as malicious and be prohibited from installing on mobile device 106 without taxing the limited memory and processing resources of mobile device 106.

Figure 5:
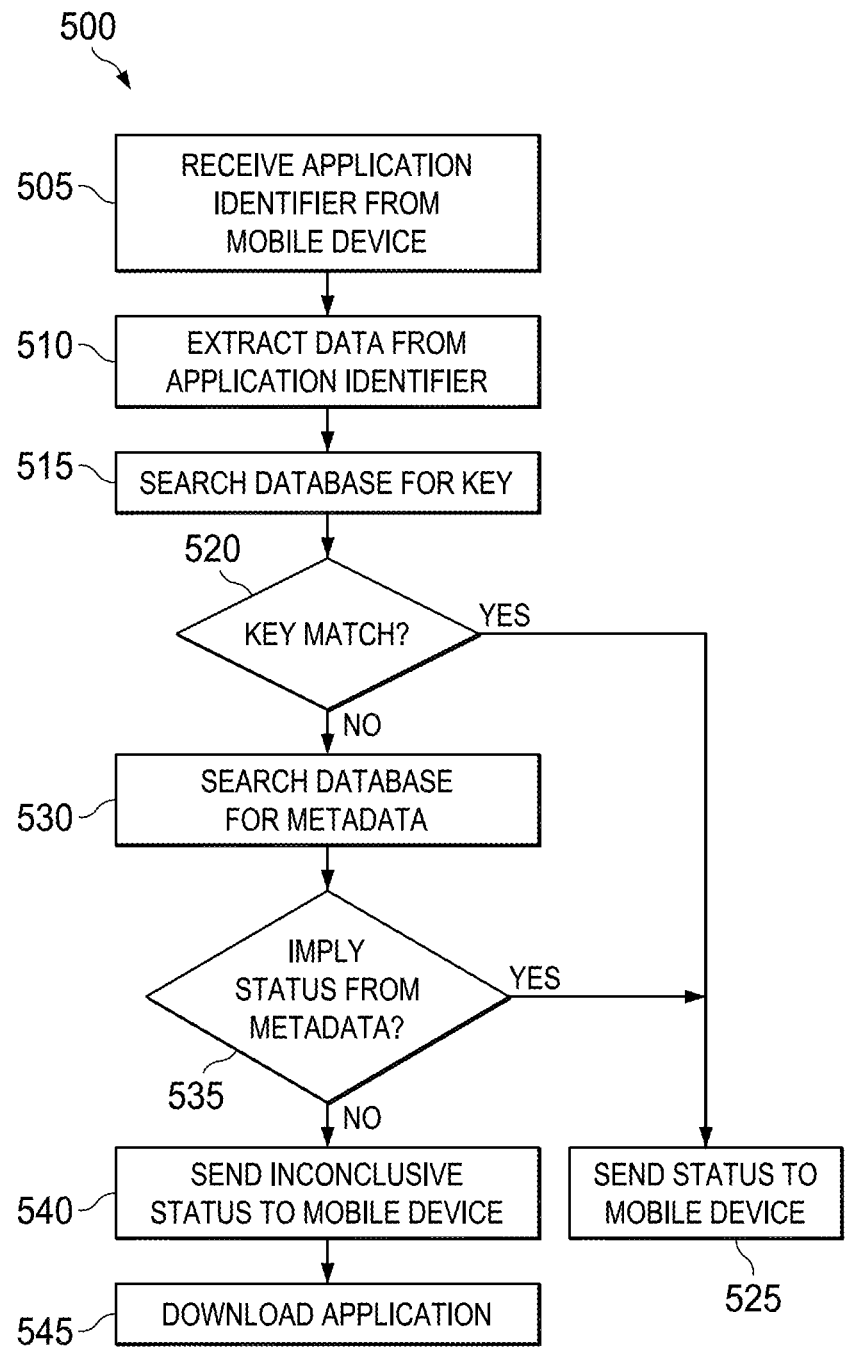
FIG. 5 is a flowchart illustrating a process by which a back-end server identifies the status of an application and communicates that status to a mobile device according to one embodiment.

Referring now to FIG. 5, process 500 illustrates an example process flow by which a back-end server application identifies the status of a mobile application and communicates that status to a mobile device in accordance with an embodiment of this disclosure. At step 505, a server application receives an application identifier from mobile device 106. As described with respect to FIG. 3 and FIG. 4, the application identifier contains information identifying a mobile application for which a call to an installation operation has been intercepted on mobile device 106.

At step 510, the server application extracts the data from the application identifier. In one embodiment, the application identifier is communicated to the server application in an encrypted form. Thus, extracting data from the application identifier may involve decrypting the application identifier as well as extracting and interpreting a key that uniquely identifies the mobile application and metadata associated with the mobile application from the application identifier.

At step 515, the server application can utilize the key extracted from the application identifier to detect a matching mobile application in database 430. As described above, the server application can search the Internet for mobile applications and maintains database 430 of the statuses of the identified mobile applications. In one embodiment, the server application, in conjunction with the analysis of an application, may provide a certificate to a provider of the mobile application indicating that the application has been analyzed and is safe for installation. For example, an online application repository may display a certificate associated with a mobile application such that a user of mobile device 106 can be certain that the application is safe for installation. Thus, although installation of the mobile application may still be contingent on receiving an indication that it is safe from the server application, a user of mobile device 106 can be confident that an application is safe and will be allowed to be installed before purchasing the application if the application bears such a certificate. At step 520, it is determined if a matching key exists in database 430.

If a matching key is found in database 430, the server application sends the status of the mobile application to mobile device 106 at 525. As described above, the status may include a discrete indication identifying the mobile application as either malicious or benign or may include a reputation score to be compared to a configurable reputation threshold by mobile device 106 in order to determine if it is safe to install the mobile application. The status sent to mobile device 106 may also include additional information, such as properties of the application, which the server application maintains in database 430. For example, although a particular mobile application may be identified as benign, the status transmitted to the mobile device may additionally indicate properties of the mobile application that a user of mobile device 106 may wish to know (e.g., the application enables GPS tracking, etc.).

If no key match is found in database 430, database 430 may be searched using the metadata extracted from the application identifier at 530. The extracted metadata may provide information such as the name of the application, a publisher of the application, a source of the application (e.g., a website from which the application was downloaded), a digital signature used to sign the application, etc. Although no direct match exists for the mobile application in database 430, the metadata may be utilized to imply a status of the mobile application. For example, if multiple records appear in database 430 for a particular application publisher and all or some substantial portion of the applications associated with the publisher are determined to be malicious, it may be implied that a mobile application having the same publisher is malicious. Likewise, if multiple records for a particular source of a mobile application indicate that all or some substantial portion of such applications associated with the source are benign, it may be implied that a mobile application from the same source is benign. If the status of a mobile application can be implied based on the metadata extracted from the application identifier at 535, the status is sent to mobile device 106 at 525. If, however, the status of a mobile application cannot be implied from the extracted metadata at 535, the server application can send an inconclusive status to the mobile device at 540. This inconclusive status may be handled by mobile device 106 in different ways. In one embodiment, mobile device 106 may allow the installation of the mobile application with the inconclusive status to proceed. In another embodiment, the installation of a mobile application having an inconclusive status may always be blocked. In still another embodiment, the installation of a mobile application having an inconclusive status may be paused until a conclusive status can be obtained. For example, at step 545, the server application may utilize the extracted metadata (e.g., the source of the application) to download the mobile application. As such, a record for the mobile application associated with the received application identifier can be added to database 430. If the server application is able to download and analyze the mobile application, it may subsequently send a conclusive status to mobile device 106. Thus, if mobile device 106 is configured to pause the installation of a mobile application having an inconclusive status, receipt of the conclusive status from the server application may allow the mobile device to allow or block the installation.

As should be apparent from the above explanation, embodiments disclosed herein illustrate systems, methods, and computer program products for identifying and preventing the installation of a malicious application on a mobile device without taxing the limited memory and processing resources of the mobile device. Although certain examples have been illustrated for mobile devices having a particular operating system, the disclosed embodiments are equally applicable to mobile devices of all types and all operating systems.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resort to the claims being necessary to determine such inventive subject matter. In addition, reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment. It is also to be understood that the above-described embodiments may be used in combination with each other and illustrative process steps may be performed in an order different than shown. Many other embodiments will be apparent to those of skill in the art upon reviewing the above description.

What is claimed is:

1. At least one non-transitory computer readable medium comprising computer executable instructions stored thereon that, when executed, cause at least one processor to:

receive an application identifier from a mobile device over a network connection, the application identifier comprising a key uniquely identifying an application for which a call to an installation operation has been intercepted on the mobile device, wherein the key is a hash computed from at least a portion of a mobile application setup file associated with the application;

utilize at least a portion of the application identifier to determine a status of the application from a database of records including statuses of a plurality of analyzed applications, wherein the application identifier comprises metadata associated with the application; and send the status of the application and one or more properties of the application to the mobile device over the network connection, wherein the one or more properties indicate functionality of the application to be enabled when the application is installed on the mobile device.

2. The at least one non-transitory computer readable medium of claim 1, wherein the computer executable instructions, when executed, cause the at least one processor to:

search the database for a record corresponding to the key to determine the status of the application.

3. The at least one non-transitory computer readable medium of claim 1, wherein the computer executable instructions, when executed, cause the at least one processor to:

utilize the metadata to determine the status of the application from the records in the database if no record corresponding to the key exists in the database.

4. The at least one non-transitory computer readable medium of claim 3, wherein the metadata indicates a source of the application, wherein the computer executable instructions, when executed, cause the at least one processor to:

determine the application is malicious based, at least in part, on a threshold corresponding to other applications associated with the source and known to be malicious.

5. The at least one non-transitory computer readable medium of claim 1, wherein the computer executable instructions, when executed, cause the at least one processor to:

extract, from the application identifier, the key and the metadata associated with the application.

6. The at least one non-transitory computer readable medium of claim 5, wherein the extracting is to include decrypting the application identifier.

7. The at least one non-transitory computer readable medium of claim 1, wherein the application identifier is received via a short message service (SMS) to a predefined telephone number.

8. The at least one non-transitory computer readable medium of claim 1, wherein the application identifier is received via one of dual-tone multi-frequency signaling or interactive voice response (IVR) messaging if communication is initiated between the mobile device and a predefined telephone number.

9. An apparatus, the apparatus comprising:
at least one hardware processor; and
a server application coupled to the at least one hardware processor and when running on the at least one hardware processor, the server application is to:
receive an application identifier from a mobile device over a network connection, the application identifier comprising a key uniquely identifying an application for which a call to an installation operation has been intercepted on the mobile device, wherein the key is a hash computed from at least a portion of a mobile application setup file associated with the application;

utilize at least a portion of the application identifier to determine a status of the application from a database of records including statuses of a plurality of analyzed applications, wherein the application identifier comprises metadata associated with the application; and send the status of the application and one or more properties of the application to the mobile device over the network connection, wherein the one or more properties indicate a functionality of the application to be enabled when the application is installed on the mobile device.

10. The apparatus of claim 9, wherein when running on the at least one hardware processor, the server application is to:

search the database for a record corresponding to the key to determine the status of the application.

11. The apparatus of claim 9, wherein when running on the at least one hardware processor, the server application is to:

utilize the metadata to determine the status of the application from the records in the database if no record corresponding to the key exists in the database.

12. The apparatus of claim 11, wherein when running on the at least one hardware processor, the server application is to:

determine the application is malicious based, at least in part, on a threshold corresponding to other applications known to be malicious and associated with a source of the application, wherein the metadata indicates the source of the application.

13. The apparatus of claim 9, wherein when running on the at least one hardware processor, the server application is to:

extract, from the application identifier, the key and the metadata associated with the application.

14. The apparatus of claim 13, wherein the extracting is to include decrypting the application identifier.

15. A method, comprising:
receiving, at a server application utilizing at least one hardware processor, an application identifier from a mobile device over a network connection, the application identifier comprising a key uniquely identifying an application for which a call to an installation operation has been intercepted on the mobile device, wherein the key is a hash computed from at least a portion of a mobile application setup file associated with the application;

utilizing at least a portion of the application identifier to determine a status the application from a database of records including statuses of a plurality of analyzed applications, wherein the application identifier comprises metadata associated with the application; and sending the status of the application and one or more properties of the application to the mobile device over the network connection, wherein the one or more properties indicate a functionality of the application to be enabled when the application is installed on the mobile device.

16. The method of claim 15, further comprising:
searching the database for a record corresponding to the key to determine the status of the application.

17. The method of claim 15, further comprising:
utilizing the metadata to determine the status of the application from the records in the database if no record corresponding to the key exists in the database.

18. The method of claim 17, further comprising:
determining the application is malicious based, at least in part, on a threshold corresponding to other applications known to be malicious and associated with a source of the application, wherein the metadata indicates the source of the application.

* * * * *

UNITED STATES PATENT AND TRADEMARK OFFICE
CERTIFICATE OF CORRECTION

PATENT NO. : 9,596,257 B2
APPLICATION NO. : 14/851619
DATED : March 14, 2017
INVENTOR(S) : Sudeep Das et al.

Page 1 of 1

It is certified that error appears in the above-identified patent and that said Letters Patent is hereby corrected as shown below:

In the Claims

In Column 14, Line 54, in Claim 15, replace "status the" with -- status of the --.

Signed and Sealed this
Sixteenth Day of May, 2017

Michelle K. Lee
*Director of the United States Patent and Trademark Office*